(12) United States Patent
Alfermann et al.

(10) Patent No.: US 7,936,104 B2
(45) Date of Patent: *May 3, 2011

(54) PERMANENT MAGNET MACHINES WITH STATOR POLE SECTIONS HAVING DIFFERENT MAGNETIC MATERIALS

(75) Inventors: Timothy J. Alfermann, Noblesville, IN (US); Arthur L. McGrew, Jr., Indianapolis, IN (US); Ahmed M. El-Antably, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/406,637

(22) Filed: Mar. 18, 2009

(65) Prior Publication Data

US 2010/0237736 A1 Sep. 23, 2010

(51) Int. Cl.
*H02K 1/00* (2006.01)
(52) U.S. Cl. .... 310/216.015; 310/216.008; 310/216.074
(58) Field of Classification Search .......... 310/216.007, 310/216.057, 216.074, 216.079, 216.109, 310/216.008–216.015; 336/178, 212, 219, 336/233–234
See application file for complete search history.

(56) References Cited

U.S. PATENT DOCUMENTS

| | | | | |
|---|---|---|---|---|
| 4,255,684 A | * | 3/1981 | Mischler et al. | 310/216.031 |
| 5,051,637 A | * | 9/1991 | Harris et al. | 310/90.5 |
| 6,472,792 B1 | * | 10/2002 | Jack et al. | 310/216.066 |
| 7,567,010 B1 | * | 7/2009 | Farnia | 310/216.067 |
| 7,646,130 B2 | * | 1/2010 | Holmes et al. | 310/216.007 |
| 2009/0256430 A1 | * | 10/2009 | Farnia | 310/44 |

* cited by examiner

*Primary Examiner* — Tran N Nguyen
(74) *Attorney, Agent, or Firm* — Ingrassia Fisher & Lorenz, P.C.

(57) ABSTRACT

A permanent magnet machine includes a rotor and a stator including plurality of stator pole sections. Each stator pole section comprises a core section having an inner end piece disposed adjacent to the core section, the inner end piece comprising a first magnetic material that is adapted to saturate during exposure to a first magnetic field strength, and an outer end piece disposed adjacent to the core section radially outwardly relative to the inner end piece, the outer end piece comprising a second magnetic material that is adapted to be unsaturated during exposure to the first magnetic field strength and to saturate during exposure to a second magnetic field strength, wherein the second magnetic field strength is greater than the first magnetic field strength.

20 Claims, 2 Drawing Sheets

PERMANENT MAGNET MACHINES WITH STATOR POLE SECTIONS HAVING DIFFERENT MAGNETIC MATERIALS

TECHNICAL FIELD

The present invention generally relates to permanent magnet machines, and more particularly relates to stators for use in permanent magnet machines.

BACKGROUND

Alternating current (AC) motors are used in a variety of applications. To power an AC motor, a current is typically supplied to the AC motor via a direct current (DC) bus voltage source, such as a battery. The current flows through windings in a stator or a rotor of the AC motor to produce a magnetic field. The current flow creates a torque within the AC motor causing the rotor to rotate and to thereby produce mechanical power. To reduce unwanted torque pulsations in the AC motor resulting from harmonics which may be present in the AC motor during current input, a voltage source inverter is used to transform the current from the DC bus voltage source into a sinusoidally-shaped motor phase current.

In some cases, the AC motor may be a permanent magnet (PM) machine. Typically, as the speed of the PM machine increases, the amount of current supplied to the PM machine increases. However, if the PM machine operates above a predetermined speed, a phase voltage within the PM machine may exceed a supplied bus voltage from the DC bus voltage, which may create a machine flux (also known as a back electromotive force (EMF)). Generally, a back EMF may undesirably reduce operational efficiency of the PM machine.

To retain control of the PM machine, the back EMF may be reduced using field-weakening. In this regard, a demagnetizing current typically is applied to the PM machine to reduce the magnet or total flux of the PM machine. Although this field-weakening technique operates sufficiently, it may be improved. In particular, additional components may be included in the PM machine in order to supply the demagnetizing current, which may undesirably increase weight and size of the PM machine. Moreover, supplying the demagnetizing current to the PM machine may direct energy resources to non-torque producing currents. Additionally, the rotational speed of the PM machine may be limited by the amount of demagnetizing current that may be supplied to counteract the back EMF.

Accordingly, it is desirable to have a PM machine that may reduce back EMF with minimal additional components. In addition, it is desirable for the improved PM machine to be capable of operating at rotational speeds that are greater than speeds at which conventional PM machines operate. Furthermore, other desirable features and characteristics of the present invention will become apparent from the subsequent detailed description and the appended claims, taken in conjunction with the accompanying drawings and the foregoing technical field and background.

BRIEF SUMMARY

Permanent magnet machines are provided. In accordance with an embodiment, by way of example only, a permanent magnet machine includes a rotor and a stator, the stator including plurality of stator pole sections disposed circumferentially around the stator. Each stator pole section comprises a core section extending axially along the stator, an inner end piece disposed adjacent to the core section, the inner end piece comprising a first magnetic material that is adapted to saturate during exposure to a first magnetic field strength, and an outer end piece disposed adjacent to the core section radially outwardly relative to the inner end piece, the outer end piece comprising a second magnetic material that is adapted to be unsaturated during exposure to the first magnetic field strength and to saturate during exposure to a second magnetic field strength, wherein the second magnetic field strength is greater than the first magnetic field strength.

In accordance with another embodiment, by way of example only, a permanent magnet machine includes a rotor and a stator, the stator including a plurality of stator pole sections disposed circumferentially around the stator. Each stator pole section comprises a core section extending axially along the stator and having a first end, an inner end piece disposed adjacent to the core section, the inner end piece comprising a first magnetic material that is adapted to saturate during exposure to a first magnetic field strength. A first outer end piece extends from the first end of the core section and is located radially outwardly relative to the inner end piece, the first outer end piece and the core comprising a second magnetic material adapted to be unsaturated during exposure to the first magnetic field strength and to saturate during exposure to a second magnetic field strength, wherein the second magnetic field strength is greater than the first magnetic field strength.

In accordance with still another embodiment, by way of example only, a permanent magnet machine includes a rotor and a stator, the stator including a plurality of stator pole sections disposed circumferentially around the stator. Each stator pole section comprises a core section extending axially along the stator, an inner end piece disposed adjacent to the core section, and an outer end piece disposed adjacent to the core section and located radially outwardly relative to the inner end piece. The inner end piece comprises a first magnetic material that is adapted to saturate during exposure to a first magnetic field strength. The outer end piece comprises a second magnetic material adapted to be unsaturated during exposure to the first magnetic field strength and to saturate during exposure to a second magnetic field strength, wherein the second magnetic field strength is greater than the first magnetic field strength. The core section comprises a third magnetic material adapted to be unsaturated during exposure to the first magnetic field strength and to saturate during exposure to a third magnetic field strength, wherein the third magnetic field strength is greater than the first magnetic field strength and less than the second magnetic field strength.

DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
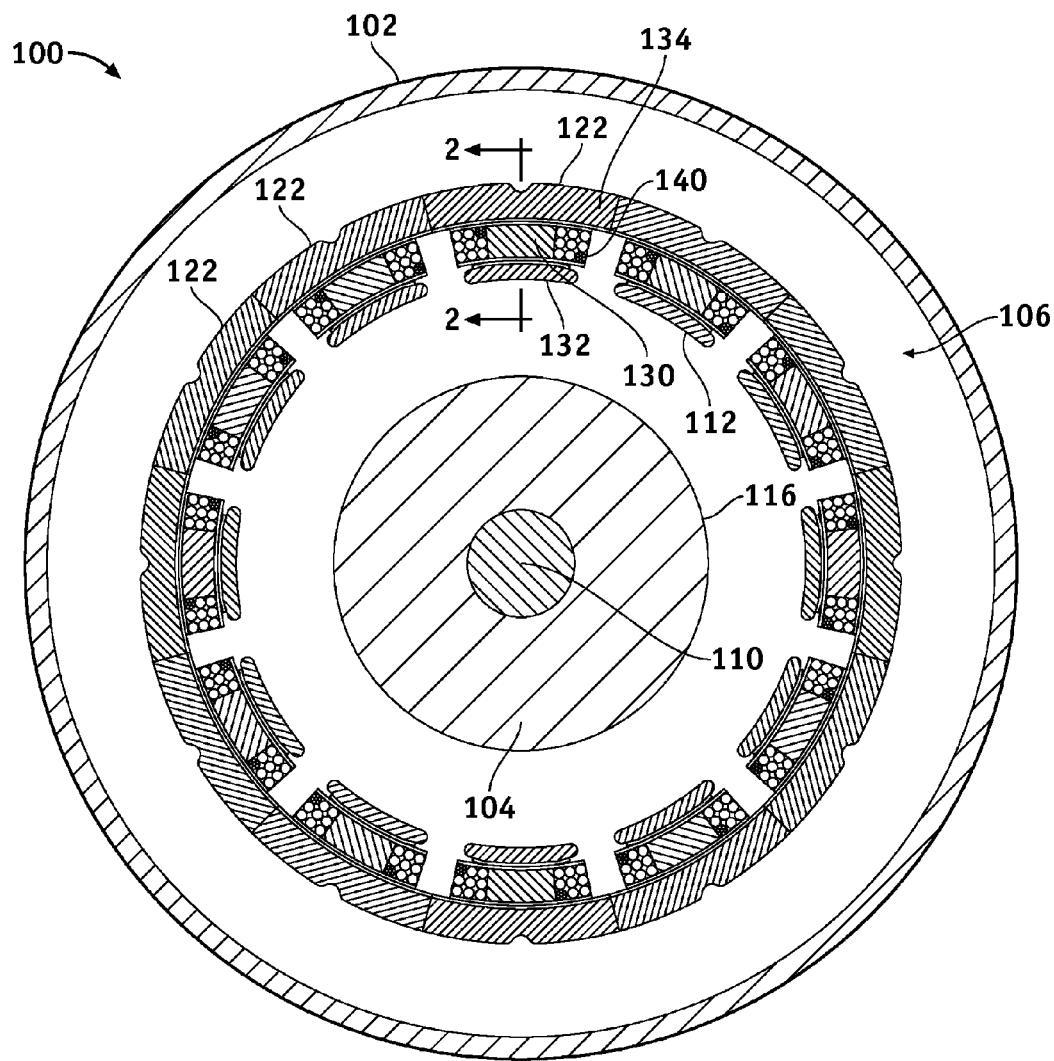
FIG. 1 is a cross-sectional end view of a stator that may be implemented into a simplified permanent magnetic motor, according to an embodiment.

FIG. 1 is a cross-sectional end view of a simplified permanent magnet motor 100, according to an embodiment. The permanent magnet motor 100 may be a direct current (DC) motor, an alternating current (AC) motor, or another type of motor in which permanent magnets may be employed. The permanent magnet motor 100 includes a housing 102, a rotor 104, and a stator 106. The rotor 104 is disposed within the housing 102 and is mounted to a rotatable shaft 110. The stator 106 surrounds the rotor 104 and is disposed between the rotor 104 and the housing 102. In an embodiment, an inner surface 112 of the stator 106 and an outer surface 116 of the rotor 104 are spaced apart to provide an air gap. In accordance with an embodiment, the air gap may have a width in a range of from about 2.4 mm to about 3.1 mm. In other embodiments, the width of the air gap may be larger or smaller than the aforementioned range.

According to an embodiment, the permanent magnet motor 100 may be configured to approach a maximum operational rotational speed, while reducing a total magnitude of flux that may be present in the stator 106 when compared with conventional motors. In this regard, the stator 106 may include a plurality of stator pole sections 122. Each stator pole section 122 may be arcuately-shaped, in an embodiment, and may be disposed circumferentially around the rotor 104 to form a ring. In accordance with an embodiment, twelve stator pole sections 122 are included in the permanent magnet machine 100; however, in other embodiments, fewer or more sections may alternatively be included.

In an embodiment, the stator pole section 122 is configured to extend axially along the stator 106 to thereby extend parallel to a longitudinal axis of the stator 106. According to an embodiment, the stator pole section 122 may extend along substantially an entire length (e.g., ±1.0 cm) of the stator 106. For example, the stator pole section 122 may have a length that is in a range of from about 160 mm±0.8 mm. In other embodiments, the stator pole section 122 may be longer or shorter than the length of the rotor 104, and may have a length that is greater or less than the aforementioned range.

Figure 2:
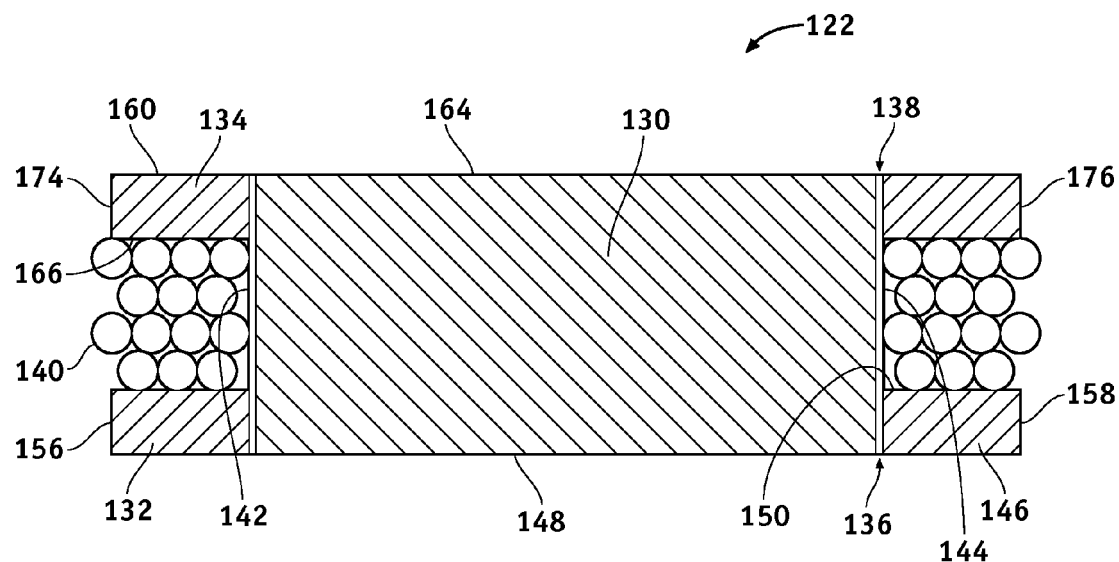
FIG. 2 is a cross-sectional side view of the stator pole section shown in FIG. 1 taken along line 2-2, according to an embodiment.

FIG. 2 is a cross-sectional side view of the stator pole section shown in FIG. 1 taken along line 2-2, according to an embodiment. Each stator pole section 122 may include a core section 130, an inner end piece 132, an outer end piece 134, and one or more windings 140, in an embodiment. The core section 130 has first and second ends 142, 144 and has an axial length (measured between the first and the second ends 142, 144) in a range of from about 108 mm±0.8 mm and a thickness (measured between an inner axially-extending wall 148 and an outer axially-extending wall 164 of the core section 130) in a range of from about 45.65 mm±0.3 mm. In other embodiments, the core section 130 may be longer, shorter, thicker or thinner than the aforementioned range.

In an embodiment, the inner end piece 132 is configured to surround at least a portion of the core section 130 such that the core section 130 may be disposed adjacent to the rotor 104 (FIG. 1), when the motor 100 (FIG. 1) is assembled. In this regard, in accordance with an embodiment, the inner end piece 132 includes an opening 136 for a portion of the core section 130 to extend therethrough. In an embodiment, the opening 136 may have dimensions that are larger than those of at least the inner axially-extending wall 148 of the core section 130 or otherwise suitable for accommodating the inner axially-extending wall 148 of the core section 130. According to an embodiment, the opening 136 extends between a first axially-extending wall 146 of the inner end piece 132 and a second axially-extending wall 150 of the inner end piece 132. In an embodiment, the first axially-extending wall 146 is located radially inwardly relative to the second axially-extending wall 150 of the inner end piece 132. In another embodiment, the first axially-extending wall 146 lies substantially flush with the inner axially-extending wall 148 of the core section 130. In still another embodiment, the first axially-extending wall 146 does not lie substantially flush with the inner axially-extending wall 148 of the core section 130 and, for example, the inner axially-extending wall 148 of the core section 130 may be disposed radially inwardly or radially outwardly with respect to the first axially-extending wall 146.

Figure 3:
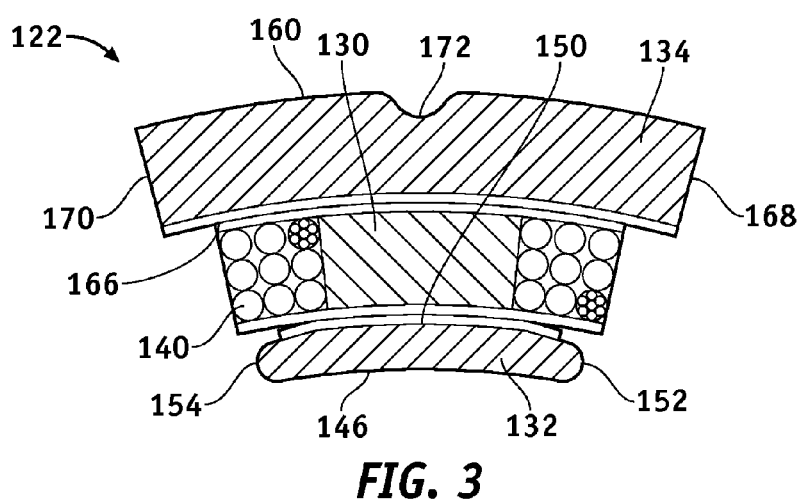
FIG. 3 is a close-up, cross-sectional end view of a stator pole section of the stator shown in FIG. 1, according to an embodiment.

FIG. 3 is a close-up, end view of the stator pole section 122 of the stator 106 shown in FIG. 1, according to an embodiment. Two side walls 152, 154 extend between the first and second axially-extending walls 146, 150 of the inner end piece 132. The side walls 152 154, illustrated as being curved in FIG. 3, may alternatively be flat in other embodiments. In an embodiment, the first and second axially-extending walls 146, 150 are curved; however, in other embodiments, they may be flat.

Referring to both FIGS. 2 and 3, in an example, the inner end piece 132 may have a thickness (measured from the first axially-extending wall 146 to the second axially-extending wall 150) in a range of from about 9.0 mm±0.5 mm, an axial length (measured from a first end 156 (FIG. 2) of the inner end piece 132 to a second end 158 (FIG. 2) of the inner end piece 132) in a range of from about 160 mm±0.8 mm, and a width (measured between the first and second side walls 152, 154) in a range of from about 52.2 mm to about 52.4 mm. In other embodiments, the dimensions of the inner end piece 132 may be greater or less than the aforementioned ranges.

With continued reference to FIG. 2, the outer end piece 134 is located radially outward relative to the inner end piece 132. In an embodiment, the outer end piece 134 may be formed separately from the core section 130. In this regard, in accordance with an embodiment, the outer end piece 134 may be configured to surround at least a portion of the core section 130, when the motor 100 (FIG. 1) is assembled. For example, the outer end piece 134 may include an opening 138 that allows a portion of the core section 130 to extend therethrough. In an embodiment, the opening 138 may have dimensions that are larger than those of at least the outer axially-extending wall 164 of the core section 130 or otherwise suitable for accommodating the outer axially-extending wall 164 of the core section 130. According to an embodiment, the opening 136 extends between first and second axially-extending walls 160, 166 of the outer end piece 134. The first axially-extending wall 160 of the outer end piece 134 may form a portion of the outer surface of the stator pole section 122 and lies radially outwardly relative to the second axially-extending wall 166 of the outer end piece 134. In an embodiment, the first axially-extending wall 160 of the outer end piece 134 lies substantially flush with the outer axially-extending wall 164 of the core section 130. In another embodiment, the first axially-extending wall 160 does not lie substantially flush with the outer axially-extending wall 164 of the core section 130 and, for example, the outer axially-extending wall 164 may be disposed radially inwardly or radially outwardly with respect to the first axially-extending wall 160.

Referring back to FIG. 3, two side walls 168, 170 extend between the first and second axially-extending walls 160, 166. The side walls 168, 170 are configured to contact the side walls of adjacent end pieces of adjacent core sections as shown in FIG. 1, and may be substantially flat. In other embodiments, portions of the side walls 168, 170, such as areas that form corners with the axially-extending walls 160, 166 may alternatively be curved. In an embodiment, the first and second axially-extending walls 160, 166 are curved; however, in other embodiments, they may be flat. According to an embodiment, the first axially-extending wall 160 has a groove 172; however in other embodiments, a groove may be omitted.

With reference to both FIGS. 2 and 3, in accordance with an embodiment, the outer end piece 134 may have a thickness (measured from the first axially-extending wall 160 to the second axially-extending wall 166) in a range of from about 16.0 mm±0.5 mm, an axial length (measured from a first end 174 of the outer end piece 134 to a second end 176 of the outer end piece 134) in a range of from about 160.0 mm±0.8 mm, and a width (measured between the first and second side walls 168, 170) in a range of from about 69.6 mm to about 69.7 mm. In other embodiments, the dimensions of the outer end piece 134 may be greater or less than the aforementioned ranges.

As mentioned briefly above, the inner and outer end pieces 132, 134 may be spaced a distance apart from each other. In this way, a portion of the one or more windings 140 may reside between the end pieces 132, 134, when wound around the core section 130. According to an embodiment, a distance between the second axially-extending walls 150, 166 of the inner and outer end pieces 132, 134 may be in a range of from about 22.0 mm±0.5 mm. In other embodiments, the distance between the end pieces 132, 134 may be greater or less than the aforementioned ranges.

In accordance with an embodiment, the inner end piece 132 may be larger in one or more dimensions than the outer end piece 134. In another embodiment, the outer end piece 134 may be smaller in one or more dimensions than the inner end piece 132. In still other embodiments, the end pieces 132, 134 may be similarly sized and shaped. In another embodiment, the opening 136 of the inner end piece 132 may be substantially identical in dimension to the opening 138 of the outer end piece 134. In other embodiments, the opening 136 of the inner end piece 132 may be larger or smaller in dimension than the opening 138 of the outer end piece 134.

Figure 4:
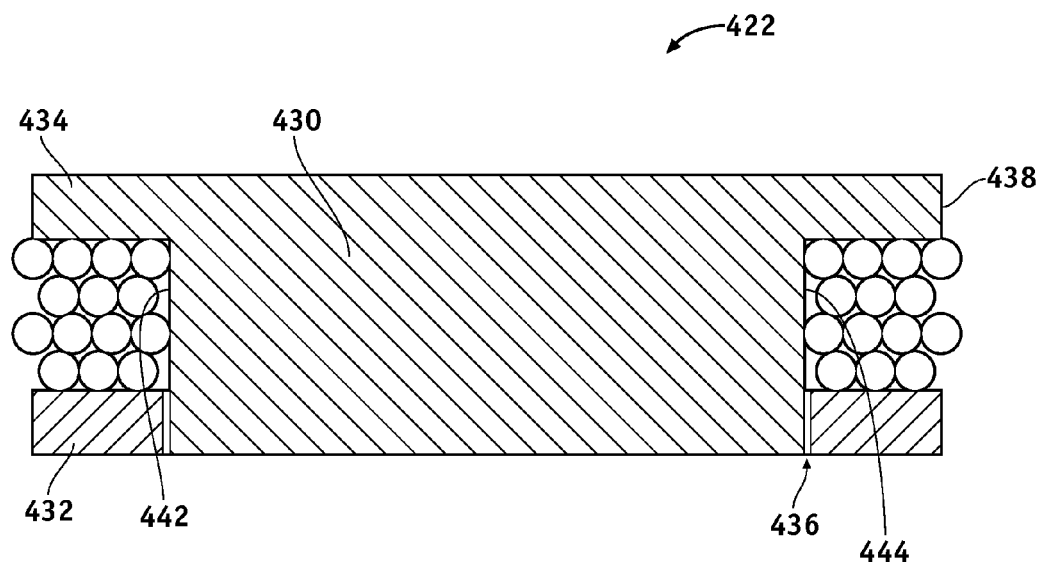
FIG. 4 is a cross-sectional side view of the stator pole section, according to another embodiment.

Although the outer end pieces 134 is shown in FIG. 3 as being formed separately from the core section 130, this may not be the case in other embodiments. FIG. 4 is a side, cross-sectional view of a stator pole section 422, according to another embodiment. Here, the stator pole section 422 includes a core section 430 that includes outer end pieces 434, 438 extending from first and second ends 442, 444 of the core section 430 to form a single, unitary component. In this way, the core section 430 and the outer end pieces 434, 438 extending therefrom may be formed from a single material. Alternatively, the outer end pieces 434, 438 and the core section 430 may comprise different materials that are pressed or otherwise bonded together to form the single, unitary component. Inner end piece 432 has an opening 438 and thus surrounds and is disposed adjacent to the first and second ends 442, 444 of the core section 430 radially inwardly from the outer end pieces 434, 438 and may be configured substantially identically to inner end piece 132 described above.

Referring back to FIG. 1, in accordance with an embodiment, to reduce a total magnitude of flux that may be present in the stator 106, at least the inner end piece 132 and the outer end piece 134, comprise different magnetic materials that each allows flux to pass through the stator 106 during exposure to different magnetic field strengths. Specifically, the inner and outer end pieces 132, 134 are adapted to allow flux to pass through the stator when exposed to a first magnetic field strength. The inner end piece 132 is configured to saturate with flux when exposed to a second magnetic field strength, while the outer end piece 134 remains unsaturated when exposed to the second magnetic field strength to allow the flux to pass through the outer end piece 134.

According to an embodiment, the inner end piece 132 comprises a first magnetic material and the outer end piece 134 comprises a second magnetic material. In an embodiment, the first magnetic material is a magnetic material that is adapted to saturate during exposure to a first magnetic field strength, and the second magnetic material is adapted to be unsaturated during exposure to the first magnetic field strength and to saturate during exposure to a second magnetic field strength, wherein the second magnetic field strength is greater than the first magnetic field strength. For example, the second magnetic material may carry about 10% to about 30% more flux in a given field than the first magnetic material. In an embodiment, the inner end piece 132 comprising the first magnetic material may have a flux saturation point that is achieved upon exposure to a magnetic field at the first magnetic field strength, while the outer end piece 134 comprising the second magnetic material may have a flux saturation point that is achieved upon exposure to a magnetic field at the second magnetic field strength, and the second magnetic material remains unsaturated upon exposure to a magnetic field at the first magnetic field strength. Although ranges for the first and second magnetic field strengths are provided above, the field strengths may be greater or less than the aforementioned ranges. Additionally, although the magnetic field strength ranges preferably do not overlap in an embodiment, they may overlap in other embodiments.

In an embodiment, the magnetic materials may comprise soft magnetic composites. As used herein, the term "soft magnetic composite" may be defined as an insulated coated ferrous powder metal material that can be molded into a component. In some cases, the soft magnetic composite may be formed into the component using a high pressure compaction process. In accordance with an embodiment, the soft magnetic composite may include a ferromagnetic material and a polymer coating. Examples of suitable ferromagnetic materials include, but are not limited to Somaloy® 500 and Somaloy® 700 (both available through Hoganas AB of Hoganas Sweden) and the like. In still another embodiment, the soft magnetic composite may include an insulating material disposed over a ferromagnetic material or serving as a matrix within which a ferromagnetic material is disposed. The insulating material may be inorganic or organic, and may include, but is not limited to $Fe_2O_3$, zinc phosphate, iron phosphate, manganese phosphate, a sulfate coating, or another thermoplastic or thermoset coating, in an embodiment.

To provide materials having varying flux saturation points, the first magnetic material and the second magnetic material may comprise different magnetic materials including different elemental compositions, in an embodiment. For example, the first magnetic material may include the ferromagnetic material and a first type of insulating material, while the second magnetic material may include the ferromagnetic material and a second type of insulating material. Alternatively, the first magnetic material may include a first type of ferromagnetic material and a first insulating material, and the second magnetic material may include a second type of ferromagnetic material and the first insulating material or a second insulating material. In another embodiment, the first and second magnetic materials may comprise substantially identical elemental compositions; however the constituents of the compositions may be present at different weight percentages. For example, the first magnetic material may include, by volume, about 6.0% to about 6.5% of the insulating material, while the second magnetic material may include, by volume, about 4.0% to about 5.0% of the insulating material. In other embodiments, percentage ranges may be more or less than the aforementioned ranges. In one example, the first magnetic material may comprise Somaloy® 500, and the second magnetic material may comprise Somaloy® 700. In still another embodiment, the first magnetic material and the second magnetic material may each comprise ferromagnetic materials that are coated with an insulating material, and a thickness of the insulating material may differ for each of the first and second magnetic materials.

According to an embodiment, the core section 130 may comprise either the first magnetic material or the second magnetic material. In another embodiment, the core section 130 may comprise a third magnetic material adapted to be unsaturated during exposure to the first magnetic field strength and the second magnetic field strength and to saturate during exposure to a third magnetic field strength, wherein the third magnetic field strength is greater than the first magnetic field strength and less than the second magnetic field strength. In such case, the third magnetic material may comprise similar materials described above for the first and second magnetic materials; however the third magnetic material may be formulated and/or configured to have a suitable, desired flux saturation point.

In any case, during operation, current from a power source (not shown) is supplied to the windings 140 causing the stator 106 to generate a magnetic field having one or more predetermined paths along which flux may travel. In an embodiment, a first set of predetermined paths may exist through inner end piece 132 of the stator pole sections 122, and a second set of predetermined paths may exist through outer end piece 134 of the stator pole sections 122. When a first magnitude of current is supplied to the PM machine 100 to cause the rotor 104 to rotate at a first rotational speed, flux may travel along the first and second sets of predetermined paths. Thus, flux may travel through the core sections 130 and the inner and outer end pieces 132, 134 of the stator pole sections 122. When a second magnitude of current is supplied to the PM machine 100 to cause the rotor 104 to rotate at a second rotational speed that is greater than the first rotational speed, the first set of predetermined paths may become crowded, and the inner end piece 132 may reach a flux saturation point; however, the second set of predetermined paths through the outer end piece 134 and the core sections 130 may remain unsaturated to allow flux to flow through. When a third magnitude of current is supplied to the PM machine 100 to cause the rotor 104 to rotate at a third rotational speed that is greater than the first and second speeds, the second set of predetermined paths may become crowded and the outer end piece 134 and the core sections 130 may reach a flux saturation point. In such case, a demagnetizing current may be supplied to the PM machine to counteract back EMF that may result. Alternatively, the PM machine may be powered down or the current adjusted to cause the rotor 104 to rotate at a reduced speed. In another embodiment in which a third set of predetermined paths in the core section 130 are included, when the second magnitude of current is supplied to the PM machine 100 to cause the rotor 104 to rotate at the second rotational speed that is greater than the first speed, the first set of predetermined paths may become crowded and the inner end piece 132 may reach a flux saturation point; however, the second and third sets of predetermined paths through the outer end piece 134 and core section 130 may remain unsaturated to allow flux to flow through. When a third magnitude of current is supplied to the PM machine 100 to cause the rotor 104 to rotate at a third rotational speed that is greater than the first and second speeds, the first and third sets of predetermined paths may become crowded and the inner end piece 134 and the core section 130 may reach a flux saturation point. However, the second set of predetermined paths may remain unsaturated to allow flux to travel through the outer end piece 136. When a fourth magnitude of current is supplied to the PM machine 100 to cause the rotor 104 to rotate at a fourth rotational speed that is greater than the first, second, and third speeds, the second set of predetermined paths may become crowded and the stator pole sections 122 may reach a flux saturation point. In such case, a demagnetizing current may be supplied to the PM machine to counteract back EMF that may result. Alternatively, the PM machine may be powered down or the current adjusted to cause the rotor 104 to rotate at a reduced speed.

A PM machine has now been described that may reduce back EMF with minimal additional components. By forming the stator from several materials, the rotor of the PM machine may be capable of rotational speeds that may be greater than speeds at which rotor of the conventional PM machines may operate. In addition, the improved PM machine may be relatively simple and inexpensive to manufacture.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A permanent magnet machine, comprising:
    a rotor; and
    a stator that includes a plurality of stator pole sections disposed circumferentially around the stator, each stator pole section comprising:
        a core section extending axially along the stator;
        an inner end piece disposed adjacent to the core section, the inner end piece comprising a first magnetic material that is adapted to saturate during exposure to a first magnetic field strength; and
        an outer end piece disposed adjacent to the core section radially outwardly relative to the inner end piece, the outer end piece comprising a second magnetic material that is adapted to be unsaturated during exposure to the first magnetic field strength and to saturate during exposure to a second magnetic field strength, wherein the second magnetic field strength is greater than the first magnetic field strength.

2. The permanent magnet machine of claim 1, wherein the core section comprises the second magnetic material.

3. The permanent magnet machine of claim 2, wherein the core section and the outer end piece form a unitary component.

4. The permanent magnet machine of claim 1, wherein the core section comprises a third magnetic material adapted to be unsaturated during exposure to the first magnetic field strength and to saturate during exposure to a third magnetic field strength, wherein the third magnetic field strength is greater than the first magnetic field strength and less than the second magnetic field strength.

5. The permanent magnet machine of claim 1, further comprising:
a winding disposed between the inner end piece and the outer end piece.

6. The permanent magnet machine of claim 1, wherein:
the inner end piece includes an opening and a portion of the core section extends through the opening of the inner end piece.

7. The permanent magnet machine of claim 1, wherein:
the outer end piece includes an opening and a portion of the core section extends through the opening of the outer end piece.

8. The permanent magnet machine of claim 1, wherein:
the first magnetic material comprises a first ferromagnetic material and a first insulating material over the first ferromagnetic material; and
the second magnetic material comprises a second ferromagnetic material and a second insulating material over the second ferromagnetic material.

9. The permanent magnet machine of claim 8, wherein the first insulating material comprises a polymer material.

10. The permanent magnet machine of claim 1, wherein:
the first magnetic material comprises a first insulating material and a first ferromagnetic material dispersed within the first insulating material; and
the second magnetic material comprises a second polymer material and a second ferromagnetic material dispersed within the second insulating material.

11. A permanent magnet machine, comprising:
a rotor; and
a stator that includes a plurality of stator pole sections disposed circumferentially around the stator, each stator pole section comprising:
a core section extending axially along the stator and having a first end;
an inner end piece disposed adjacent to the core section, the inner end piece comprising a first magnetic material that is adapted to saturate during exposure to a first magnetic field strength; and
a first outer end piece extending from the first end of the core section and located radially outwardly relative to the inner end piece, the first outer end piece and the core comprising a second magnetic material adapted to be unsaturated during exposure to the first magnetic field strength and to saturate during exposure to a second magnetic field strength, wherein the second magnetic field strength is greater than the first magnetic field strength.

12. The permanent magnet machine of claim 11, further comprising:
a winding disposed between the inner end piece and the first outer end piece.

13. The permanent magnet machine of claim 11, wherein:
the inner end piece includes an opening and a portion of the core section extends through the opening of the inner end piece.

14. The permanent magnet machine of claim 11, wherein:
the first magnetic material comprises a first ferromagnetic material and a first insulating material over the first ferromagnetic material; and
the second magnetic material comprises a second ferromagnetic material and a second insulating material over the second ferromagnetic material.

15. The permanent magnet machine of claim 11, wherein:
the first magnetic material comprises a first insulating material and a first ferromagnetic material dispersed within the first insulating material; and
the second magnetic material comprises a second insulating material and a second ferromagnetic material dispersed within the second insulating material.

16. A permanent magnet machine, comprising:
a rotor; and
a stator that includes a plurality of stator pole sections disposed circumferentially around the stator, each stator pole section comprising:
a core section extending axially along the rotor and having a first end;
an inner end piece disposed adjacent to the core section; and
an outer end piece disposed adjacent to the core section and located radially outwardly relative to the inner end piece,
wherein:
the inner end piece comprises a first magnetic material that is adapted to saturate during exposure to a first magnetic field strength,
the outer end piece comprises a second magnetic material adapted to be unsaturated during exposure to the first magnetic field strength and to saturate during exposure to a second magnetic field strength, wherein the second magnetic field strength is greater than the first magnetic field strength, and
the core section comprises a third magnetic material adapted to be unsaturated during exposure to the first magnetic field strength and to saturate during exposure to a third magnetic field strength, wherein the third magnetic field strength is greater than the first magnetic field strength and less than the second magnetic field strength.

17. The permanent magnet machine of claim 16, further comprising:
a winding extending along a length of the core section and between the inner end piece and the outer end piece.

18. The permanent magnet machine of claim 16, wherein:
the inner end piece includes an opening and a portion of the core section extends through the opening of the inner end piece.

19. The permanent magnet machine of claim 16, wherein:
the first magnetic material comprises a first ferromagnetic material and a first insulating material over the first ferromagnetic material;
the second magnetic material comprises a second ferromagnetic material and a second insulating material over the second ferromagnetic material; and
the third magnetic material comprises a third ferromagnetic material and a third insulating material over the third ferromagnetic material.

20. The permanent magnet machine of claim 16, wherein:
the first magnetic material comprises a first insulating material and a first ferromagnetic material dispersed within the first insulating material;
the second magnetic material comprises a second insulating material and a second ferromagnetic material dispersed within the second insulating material; and
the third magnetic material comprises a third insulating material and a third ferromagnetic material dispersed within the third insulating material.

* * * * *